United States Patent [19]

Myre, Jr. et al.

[11] Patent Number: 5,043,866

[45] Date of Patent: Aug. 27, 1991

[54] SOFT CHECKPOINTING SYSTEM USING LOG SEQUENCE NUMBERS DERIVED FROM STORED DATA PAGES AND LOG RECORDS FOR DATABASE RECOVERY

[75] Inventors: William W. Myre, Jr.; Cheng-Fong Shih, both of Austin, Tex.

[73] Assignee: International Business Machines Corporation, Armonk, N.Y.

[21] Appl. No.: 179,194

[22] Filed: Apr. 8, 1988

[51] Int. Cl.$^5$ .................... G06F 11/30; G06F 9/312; G06F 12/08

[52] U.S. Cl. .................. 364/200; 364/268.9; 364/267.1; 364/267.8; 364/285; 364/285.2; 364/285.3; 371/12

[58] Field of Search ... 364/200 MS File, 900 MS File; 371/12

[56] References Cited

U.S. PATENT DOCUMENTS

| | | | |
|---|---|---|---|
| 3,736,566 | 5/1973 | Anderson | 364/200 |
| 3,783,256 | 1/1974 | Caputo | 371/12 |
| 4,020,466 | 4/1977 | Cordi et al. | |
| 4,077,059 | 2/1976 | Cordi et al. | 364/200 |
| 4,159,517 | 6/1979 | Paradine et al. | 364/200 |
| 4,429,360 | 1/1984 | Hoffman | 364/200 |
| 4,459,658 | 7/1984 | Gabbe et al. | 364/200 |
| 4,498,145 | 2/1985 | Baker et al. | 364/900 |
| 4,507,751 | 3/1985 | Gawlick | 364/900 |
| 4,631,673 | 12/1986 | Haas | 364/300 |
| 4,665,520 | 5/1987 | Strom et al. | 364/200 |
| 4,674,038 | 6/1987 | Brelsford | 364/200 |
| 4,697,266 | 9/1987 | Finley | 371/12 |
| 4,703,481 | 10/1987 | Fremont | 371/12 |
| 4,751,702 | 6/1988 | Beier | 364/200 |
| 4,814,971 | 3/1989 | Thatte | 364/200 |
| 4,819,156 | 4/1989 | Delorme | 364/200 |
| 4,819,159 | 4/1989 | Shipley | 364/200 |
| 4,819,232 | 4/1989 | Krings | 371/12 |
| 4,823,261 | 4/1989 | Bank et al. | 364/200 |
| 4,852,092 | 7/1989 | Makita | 371/12 |
| 4,868,744 | 9/1989 | Reinsch | 364/200 |
| 4,878,167 | 10/1989 | Kapalka | 364/200 |

OTHER PUBLICATIONS

"Physical Integrity in a Large Segmented Database", R. Lorie, *ACM Transactions on Database Systems*, vol. 2, No. 1, Mar. 1977, pp. 91-104.

"Write-Ahead Logging Method—Determining which Pages Were in Buffers when System Crashed and Whether Buffer Page is Dirty", *Research Disclosure*, May 10, 1986, RD 265068.

*Primary Examiner*—Archie E. Williams, Jr.
*Assistant Examiner*—Eric Coleman
*Attorney, Agent, or Firm*—Robert M. Carwell

[57] ABSTRACT

Functions MINBUFLSN and LOWTRANLSN, implemented in a computerized routine, are defined and comprise first and second components of a checkpoint. MINBUFLSN is functionally related to a first update to a first of "dirty" data pages in the RAM buffer. LOWTRANLSN is functionally related to the earliest update of a sequence in a transaction table wherein each update corresponds to an uncommitted transaction. The two components are derived during write-ahead logging and stored in the log header periodically as a function of logging activity. Upon recovery, the checkpoint is retrieved and a functional comparison between the components thereof employed in the recovery algorithm. The conventional analysis pass of the recovery log is avoided and a reduced overhead during logging is provided as well as an efficient recovery.

3 Claims, 6 Drawing Sheets

SOFT CHECKPOINTING SYSTEM USING LOG SEQUENCE NUMBERS DERIVED FROM STORED DATA PAGES AND LOG RECORDS FOR DATABASE RECOVERY

TECHNICAL FIELD

This invention relates to computerized databases and, more particularly, to systems and methods for recovering data after system crashes.

BACKGROUND ART

It is well known that computerized database systems have gained wide acceptance in numerous applications. The data accumulated therein often represents vast amounts of expense and effort and is extremely valuable if not vital to the user, whereby data loss can be quite serious and costly.

Accordingly, in addition to the more conventional function of database systems in storing and manipulating data, they must also provide an additional important function of data recovery in the event of system crashes wherein normal processing ceases. One difficulty in providing recovery mechanisms was the requirement that the database be restored to a consistent state. A classic illustration of the problem of inconsistency occurs in the case of banking applications for example. A debit to a customer's account record on disk may be made followed by a crash of the bank's database system before a credit is made to a correlative account. The credit action might even have been completed in the sense of being entered in main or RAM buffer memory but simply not written to disk yet. The image of the database out on the permanent storage disk was thereby said to be in an inconsistent state.

To solve the problem, the notion of transaction boundaries developed in the art which bounded discrete sets of database actions whereby all actions such as the debit and credit actions in the example between boundaries if completed would always leave the database in a consistent state. In other words, by transaction control in a database with respect to a sequence of updates to the database either all of the updates of the sequence would be completed or none. In the event of a problem and need to recover the database after a crash before a transaction was completed operations on the database could be backed out to these transaction boundaries.

In addition to the consistency problem addressed by the concepts of transaction boundaries and commits, yet another difficulty associated with database recovery related to the problem of storage of prior data images in the event the database had to be restored to those images at recovery. In the simple previous example, this might mean retaining the original state of the two accounts in the event that the partial or in-flight transaction of only the debit action occurred. The transaction could then be backed out so that the database was left in the original consistent state prior to the incomplete transaction changing the database.

One technique which developed in the art for retaining prior image data for recovery purposes was known as shadowing or shadow paging. Early database systems employing this technique included System R, and the commercial database product SQL DS developed by the IBM Corporation, Armonk, N.Y. In this technique copies of historical data pages were retained. At transaction commits, a new copy of pages from the historical copy was made including the changes which became the new committed copy and the previous copy was deleted. Each time additional database changes occurred, the present committed copy was copied with the changes into a new committed copy of the data pages and the prior correlative data page deleted. A performance benefit of this technique occurred at commit times because changing from the old to the new data pages involved merely changing a pointer. There was no necessity to redo database actions as in the case of the later technique of write-ahead logging to be next described.

Nevertheless numerous well known disadvantages of the shadowing techniques became evident giving rise to development of algorithms supporting the write-ahead logging. These disadvantages included extra RAM and disk space and associated overhead for maintaining the shadow copies of data because in updating every page in the database second copies were required. Additional drawbacks included costly checkpoints, disturbing the physical clustering of data resulting in data fragmentation, inefficient maps, and extra I/O for page map blocks.

In summary it was operationally found that the penalties of shadow paging were too great and thus write-ahead logging was developed and thought to be a better solution to the recovery problem. An early example of this technique may be found in the aforementioned SQL/DS database system. In this technique instead of retaining an entire second copy of data, a linear record or journal is simply retained of what was done before and after a database action. Any action represented in RAM buffers even with respect to a completed transaction will not necessarily have been written out on disk. Accordingly, such work will be lost upon system crash and must be redone on recovery from the recovery log unlike in the case of the aforementioned shadow paging technique.

Under the write-ahead logging protocol in general, logged records corresponding to the changes must first be written to disk before any correlative data pages with the changes are written to the data file. One important aspect of write-ahead logging relates to checkpointing whereby points in the recovery log at which recovery should begin in the event of a system crash are periodically determined and written out. One factor upon which efficient checkpointing depends is the internal structure of the database and, more particularly the granularity of locking. In multiple user databases, a well known problem arises when more than one user is seeking to access the same data. Returning to the previous example, while a first user is reading the aforementioned debit account a second user may be changing the credit account. While the latter user's transaction is in-flight, the first user may then access the same credit account yielding inconsistent results.

A solution to the problem has been to restrict access to a portion of the database to one user, such restriction being referred to as a lock and the size of the portion of the database restricted being directly related to the "granularity" of the lock. In the previously mentioned SQL/DS database, for example, granularity of locking was at the physical data page level which encompassed many records. The significance of such large granularity in terms of database recovery was that it simplified the problems of recovery in checkpointing. The ability to commence recovery at an optimum checkpoint was a simpler problem than in systems of sub-page granularity wherein for example locking on a record level base is effected.

To illustrate why larger granularity simplifies recovery in checkpointing problems, in the case of record locking the physical page moving data in from disk and out from a RAM buffer may contain updates from more than one transaction. Moreover, of these transactions one may be committed, one may be aborting, and one may be stopped at the point of a system crash. At that point, in a database system such as DB2 with larger granularity locking, the page would at most be affected by one transaction. Consequently it would be relatively easy to deal with recovery related to that page. However, with respect to sub-page level granularity, the same page due to concurrent updates facilitated by such sub-page locking, might have multiple transactions running on it making recovery more difficult because all related database changes must then be made in the proper sequence.

Notwithstanding the simpler recovery algorithms associated with locking granularity at the data page level wherein for example it is relatively easy to keep track of whether a data page has been paged out and an update needed, developments and interest increased in provision for sub-page granularity locking and resultant recovery for multiple transactions within a data page. One reason for the desire for such concurrency was that page level locking related to a physical size of the page. However, databases operate in terms of logical objects or entities rather than arbitrary physical limitations, and thus locking at a table or record level on logical data objects was highly desired, i.e., sub-page level granularity such as on a record level. Data pages may exist in the database for purposes of I/O however the locks themselves should preferably functionally not be so limited. Thus, it was desired to provide for multiple transactions with locks on records within a single page for concurrency purposes in the context of the write-ahead logging technique for recovery.

Accordingly, techniques were developed for sub-page granularity locking and recovery techniques for multiple transactions within a data page. In one technique, write-ahead logging was provided with locking granularity finer than the size of the data page (or unit used to bring data in or write data out within the database). During normal database operations, the technique would write out or "log" detailed information about the state of the buffer pool. More particularly, status of the pages in the RAM buffer pool (i.e., which pages were "dirty", actions which dirtied them, with associated log sequence numbers or LSNs, etc.) would be periodically written out to a recovery log and put in a record containing this check point information. In addition to this data necessary for recovery, log records of the changes to the actual data in the database were also written out to the recovery log. The entire log was thus a sequence of records comprised both of checkpoint information as well as the actual data updates to the database.

At recovery time, an analysis pass would occur. During this phase, a forward pass would be made to the log, wherein all of the log records containing checkpoint information which were previously written to the log would be read out and analyzed. The optimal checkpoint at which to begin recovery would then be calculated from this information during the analysis pass.

More particularly, from the numerous checkpoint records two LSNs would be determined: an LSN related to a first update to the earliest of "dirty" pages in the buffer; and an LSN corresponding to a first update to the earliest transaction still in flight or "uncommitted". The optimal recovery point would correspond to the minimum of these LSNs. These LSNs calculated during the analysis pass will hereinafter be understood to correspond to MINBUFLSN and LOWTRANLSN of the present invention which are periodically determined and stored during normal forward processing in accordance therewith. As used herein "LSN" will refer to "log sequence number"; "LOWTRANLSN" will refer to "low transaction log sequence number"; and "MINBUFLSN" will refer to "minimum buffer log sequence number."

One problem with such prior techniques was that the entire log of the buffer pool had to be scanned (i.e., an analysis pass was required) to read all the log records just in order to calculate these two LSN values from which the optimal recovery point could be determined. This is to be contrasted with the present invention wherein the MINBUFLSN and LOWTRANLSN values are periodically determined and written to the log record as aforesaid, thereby obviating the need for an analysis pass.

Although in the prior art actual instantaneous values for MINBUFLSN and LOWTRANLSN might be more current than those last written to the log in accordance with the invention thereby yielding a more optimal recovery point, the latter or nevertheless immediately available upon recovery without the necessity for the analysis pass.

Accordingly, with the foregoing in mind, it is readily apparent that a novel technique was desired for soft checkpointing. Such a technique was desired which avoided hereinbefore noted disadvantages of shadowing while at the same time providing for sub-page concurrency and recovery from multiple page transactions within a data page. Such systems and methods were further desired for database recovery which were both quick and efficient particularly in terms of overhead required during run time to support the technique, and which avoided requiring an analysis phase on recovery.

SUMMARY OF THE INVENTION

Functions MINBUFLSN and LOWTRANLSN, implemented in a computerized routine, are defined and comprise first and second components of a checkpoint. MINBUFLSN is functionally related to a first update to a first of "dirty" data pages in the RAM buffer. LOWTRANLSN is functionally related to the earliest update of a sequence in a transaction table wherein each update corresponds to an uncommitted transaction. The two components are derived during write-ahead logging and stored in the log header periodically as a function of logging activity. Upon recovery, the checkpoint is retrieved and a functional comparison between the components thereof employed in the recovery algorithm. The conventional analysis pass of the recovery log is avoided and a reduced overhead during logging is provided as well as an efficient recovery.

BEST MODE FOR CARRYING OUT THE INVENTION

In order to describe the subject invention an explanation of certain terms and concepts hereinafter used is provided as well as a brief overview of the system and methods employed. This is followed by a more detailed description of the operation of the invention with reference to the accompanying figures.

In the art of database recovery employing write-ahead logging protocol, the following terminology is conventionally employed:

Data Pages

This term refers to fixed size blocks of storage that contain user data. Such data pages may be paged into some form of secondary storage such as a RAM buffer (wherein they will be lost in the event of a system crash). Alternatively, these pages may be paged out to a conventional form of primary storage such as a hard disk file (wherein they are preserved in the event of such a crash). A data page in a buffer will contain the most current updates thereto whereas an older copy thereof on such a disk may lack the most recent updates to the page.

Log Record

The term log record refers to a record containing both before and after images of a single data change. This log record is conventionally used to permit a REDO or UNDO of a data change using the information contained in the log record.

Recovery Log

This refers to a sequence of the just-described log records which thereby records all changes made to the database data pages in the order in which they were effected. By referencing the recovery log, the recovery process can restore the database to a consistent state.

Log Sequence Number

Each aforesaid log record in the recovery log is identified by a unique log sequence number or LSN. The LSN of a log record is the logical byte offset of the first byte of the log record from the logical beginning of the log.

Write-Ahead Logging

When a data page is updated or "dirtied", the update generates a log record with a corresponding identifying LSN. The data page is also updated with this LSN. Any "dirtied" data page contains the LSN of the log record recording the last update made to the page. In this manner, a data page is associated with a specific point in the log identified by its corresponding LSN such that all log records after this LSN do not reference that particular corresponding page. When a "dirty" data page is written out to disk, the write-ahead logging protocol specifies that the recovery log must have been previously written out to disk up to and including the log record identified by the LSN on the page to be written. This procedure insures that no data page is written out to disk before all log records recording changes to that page are already out on disk. Thus, in the event of recovery the database can thereby be restored to a consistent state.

MINBUFLSN

The database RAM buffer will at any given time contain 0 or more "dirty" pages. In the case where the buffer contains one or more "dirty" pages, one page will exist that is the oldest, i.e., a page which was updated prior to any other "dirty" page. The LSN of the first update to this page is herein defined as MINBUFLSN. It will be noted that MINBUFLSN is not necessarily identical to an LSN written to the page but rather the LSN of the first update to the page. (It is identical until the second update.)

Importance of the MINBUFLSN parameter is that it identifies the first point in the log where logged operations may need to be redone. This is because the data pages associated with any previous log records have already been written out to disk and are no longer in the buffer. When there are no "dirty" pages in the buffer, the next available or free LSN is employed as MINBUFLSN, since this LSN is the first location at which a write to a buffer page could occur.

LOWTRANLSN

This is the LSN of the first log record written by the oldest in-flight transaction. In other words, it is the smallest LSN of any log record written by a transaction still in flight. LOWTRANLSN identifies a point in the log prior to which log records of in-flight transactions do not appear.

With the foregoing in mind, an overview of the general concept of the present invention now follows. Periodically the aforementioned MINBUFLSN and LOWTRANLSN are determined and written to the RAM version of the log file header. The LSN of the last log record written to disk is also updated. The log file header is thence written to disk. These actions constitute the normal run time overhead of the checkpoint system and method of the present invention. It will be noted that maintaining MINBUFLSN and LOWTRANLSN requires relatively little overhead as does the occasional disk I/O in writing the log file header containing the checkpoint (MINBUFLSN, LOWTRANLSN).

When recovery of the database is necessitated, a start point STARTLSN in the log is determined as the minimum of (LOWTRANLSN, MINBUFLSN). If STARTLSN is smaller than the last LSN written to disk, then recovery is completed; otherwise recovery is not required. In addition, however, if LOWTRANLSN is smaller than MINBUFLSN, no data pages need be read in while recovering between LOWTRANLSN and MINBUFLSN inasmuch as the updates logged will have been applied. This phase of the invention will hereinafter be referred to as "mini analysis". After MINBUFLSN has been reached, the normal REDO process of recovery resumes.

Figure 1:
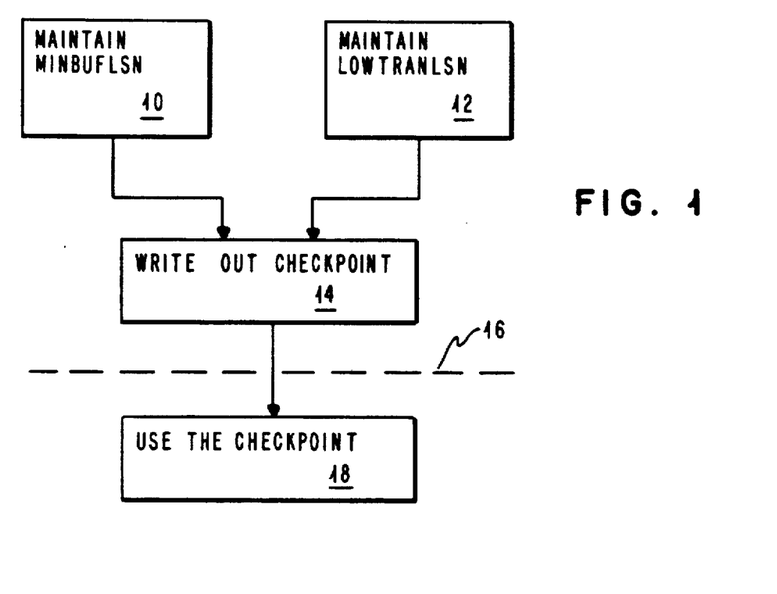
FIG. 1 is a block diagram illustrating the main functional components of the system and method of the present invention.

With reference to FIG. 1, referring first to FIG. 1, in accordance with the present invention it will be recalled that a checkpoint comprised of MINBUFLSN. and LOWTRANLSN will periodically be produced as represented by blocks 10 and 12, and thence also periodically written out to the log file header of permanent storage such as the hard file or fixed disk, as further represented at block 14. Line 16 is intended to conceptually designate the functional distinction between processes above the line for deriving and storing the checkpoint from those below line 16 wherein such checkpoints are employed after a system crash to facilitate recovery of the database. These latter recovery techniques are accordingly generically indicated at block 18 wherein the previously derived and stored checkpoint will be retrieved and utilized in the recovery process to be hereinafter described in greater detail.

Figure 2:
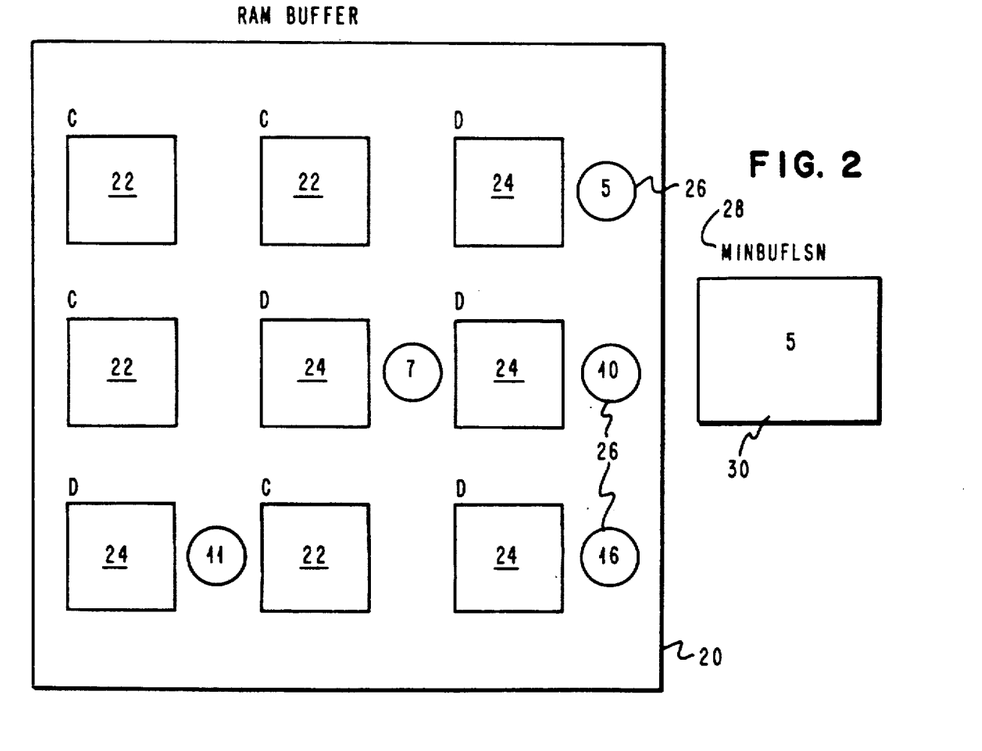
FIG. 2 is a conceptual illustration of a RAM buffer of a database depicting the relationship between MIN- BUFLSN and LSN's associated with data pages in the buffer.

Referring now to FIG. 2, this illustration is intended to conceptually depict the concept of MINBUFLSN. Secondary storage in the form of a RAM buffer 20 of a data processing system will contain a plurality of data pages 22 and 24. Some of these pages 22 may be "clean" whereas others are "dirty" pages, 24, meaning that updates have been written to them with correlative log records indicating the before and after images of these changes. Associated with each "dirty" page is a unique LSN 26 of the log write which caused the respective pages' status to change from "clean" to "dirty". As hereinbefore described, MINBUFLSN is the LSN of the first update to the oldest page, i.e., the LSN of the page updated prior to any other "dirty" page updates. It will be recalled that when there are no "dirty" pages in the buffer 20, the next available or free LSN is used as the MINBUFLSN, since this LSN is the first location at which a write to a buffer page could occur.

Thus, in the example of FIG. 2, the "dirty" pages 24 have associated therewith LSN's of 5, 7, 10, 11 and 16 in ascending order. The smallest LSN indicates the earliest associated page inasmuch as LSNs are assigned chronologically in ascending order. In accordance with the definition of MINBUFLSN, shown at reference numeral 28, for this example MINBUFLSN is the lowest number of the sequence or 5 as shown at reference numeral 30. If the "dirty" page 24 associated with the LSN of 5 is written out to disk, it accordingly disappears from the RAM buffer 20. In accordance with the process represented by block 10 of FIG. 1 in periodically deriving new MINBUFLSN (detailed in FIG. 5 to be hereinafter described) the list of LSN's corresponding to pages in the buffer 20 (i.e., 5, 7, 10, 11 and 16 in the present example) will periodically be scanned prior to writing a next checkpoint to disk for the lowest LSN associated with the "dirty" pages in the buffer 20, i.e., the MINBUFLSN 28. Thus, if this "dirty" page associated with the LSN of 5 has been written out and has disappeared from buffer 20, in accordance with this scan the LSN of 7 will replace the LSN of 5 as the new MINBUFLSN 28 thereby earmarking the "dirtied" page 24 associated with that LSN of 7 as the newly designated oldest "dirtied" page in the buffer 20.

Figure 3:
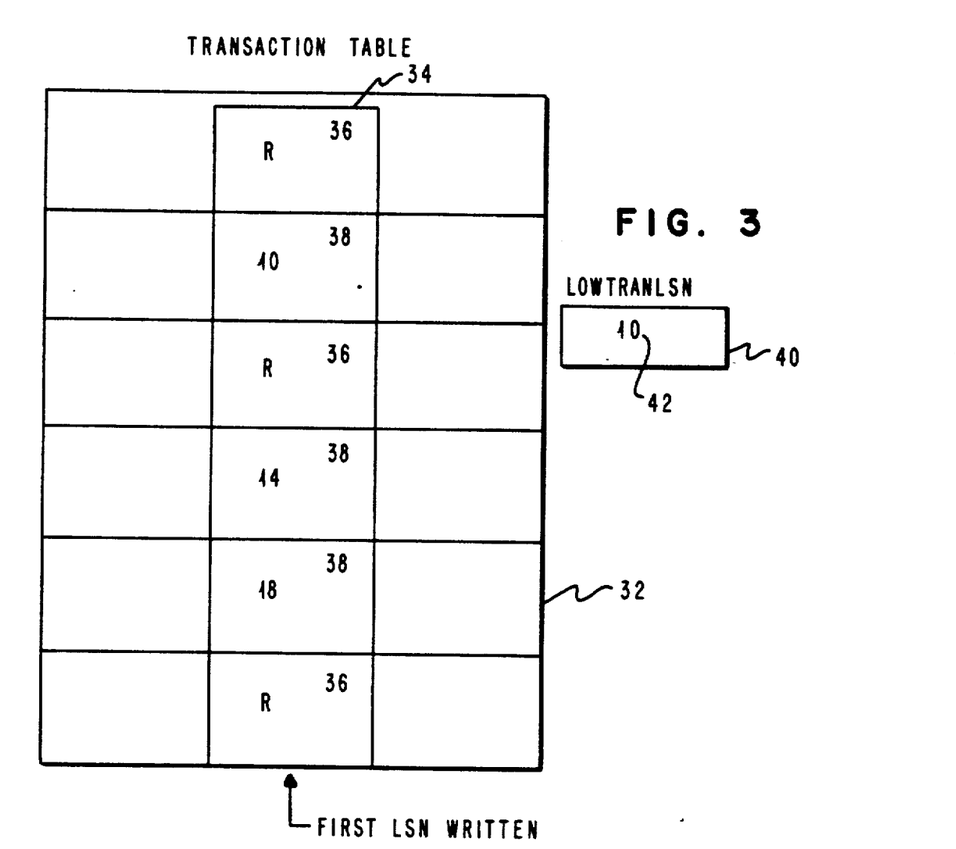
FIG. 3 is a conceptual illustration of a transaction table associated with the database depicting the relationship of LOWTRANLSN to the LSN's associated with transactions represented in the table.

Referring now to FIG. 3, a schematic illustration of a transaction table 32 is provided which is intended to conceptually indicate that in a transaction manager of a database system, it is conventional to keep track of log records written associated with transactions still in flight. One such value that is conventionally kept in a transaction table 32 is LSN's 34. When a transaction first writes a log record, the LSN of that log record is written and stored in the transaction table 34. (Log records are only written by transactions to record updates to the database. Some transactions may never update, but only read. Until a transaction makes an update, it is called a "read" transaction. Read transactions have written no log records, and thus have no LSNs associated with them. An example in FIG. 3 shows "R's" or reads (reference numeral 36) as place holders in the first transaction written column, 34, since there is no LSN to associate with these transactions.)

Continuing with the illustration of FIG. 3, a particular transaction may have written its first log record and have associated therewith an LSN 38 in the table 34 having a value of 14. Another transaction may, in like manner, have written its first log record and have associated therewith an LSN 38 having the value of 18 as shown in table 34. It will be recalled from the foregoing that LOWTRANLSN is the LSN of the first log record written by the oldest in-flight transaction, i.e., it is the smallest LSN of any log record written by a transaction still in flight inasmuch as LSN's are chronologically assigned in ascending order. With respect to the example of FIG. 3, by definition LOWTRANLSN 40 will accordingly be the minimum value of all the LSN's of the transaction table 34, i.e., the sequence of numbers 10, 14 and 18 each of which is associated with a write transaction that has written a log record. Thus, the LOWTRANLSN 40 will be the value 10 shown as reference numeral 42 which is the minimum of all of the LSN's in the column 34 comprising the first LSN's written for each transaction as recorded in the table 34.

If at any particular time no LSN's are present in buffer 20 or the table 34, LOWTRANLSN and MINBUFLSN are assigned a value corresponding to that of the next available log record. This value will of course be equal to or greater than any MINBUFLSN or LOWTRANLSN which might subsequently be determined in accordance with the procedures of FIGS. 4 and 5 due to the monotonically increasing nature of LSN's.

In summary, with respect to FIGS. 2 and 3 any time a write occurs in a database to a buffer page (the unit of I/O pages written in to or out from disk) a log record is produced having an LSN associated therewith uniquely identifying the record to the database system, and also that particular I/O write to the data page. The LSN is thereafter used to "tag" the "dirty" page and a list of such LSN's associated with the "dirty" pages is formulated. Whenever a page is first "dirtied" (i.e., the first I/O write that occurs to the page) an LSN is produced. (An LSN is of course produced any time there is a write but there is always a first such write). It is this first LSN associated with the first write which is placed in the list of of "dirty" page LSNs in buffer 20. Thus, in the list are identifiers of where in the log for all pages currently residing in the buffer pool at that time the first write has occurred to the respective "dirty" pages, with one such identifier or LSN associated with each "dirty" page.

Because the LSN's are chronologically assigned increasing sequential numbers any LSN already existing must by definition be lower than any LSN being newly allocated. Accordingly, any value of MINBUFLSN will either be equal to or less than whatever newly allocated LSN has occurred. If a buffer page is written out to disk, the LSN associated therewith is removed from the "dirty" page LSN list of the buffer 20. Similarly, if a "clean" page which may be newly read into the buffer 20 has had its first write to disk an LSN will accordingly be assigned thereto. Thus, either changes or additions to the buffer pool will accordingly cause the list of LSNs associated with "dirty" pages to change periodically.

Figure 4:
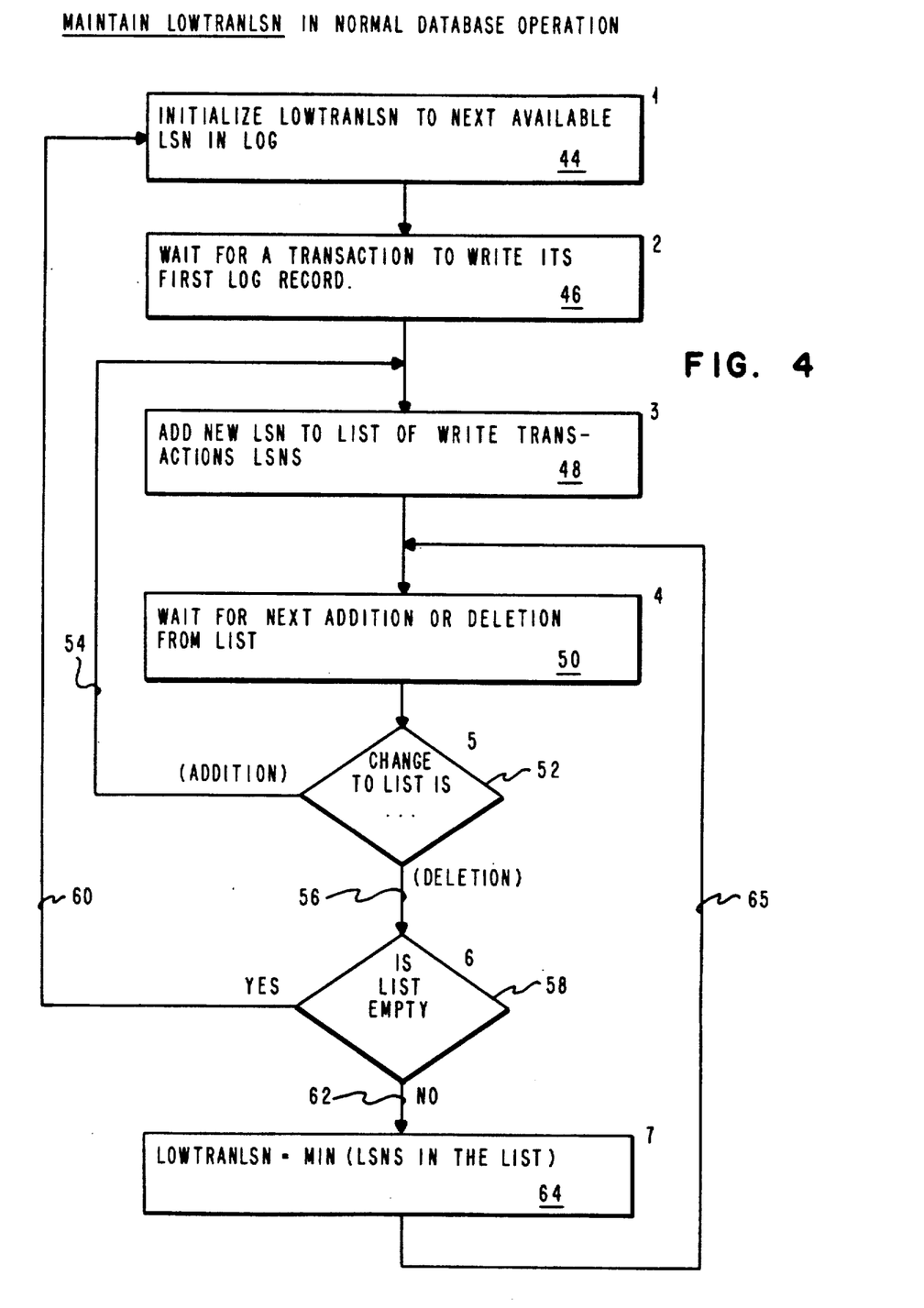
FIG. 4 is a flow diagram illustrating the method of deriving and maintaining LOWTRANLSN during normal database operation as shown in block 12 of FIG. 1.

Referring now to FIG. 4 a more detailed description will be given of the derivation and maintenance of the LOWTRANLSN component of the checkpoint during normal database operations.

Referring now to FIG. 4 a method for deriving and maintaining the value of LOWTRANLSN during normal database operation will be hereinafter detailed. First, at 44, LOWTRANLSN will be initialized to a next available LSN in the log. It will be noted that upon start up of the database, the list of in-flight write transaction's LSN's is empty. Accordingly, LOWTRANLSN is initialized to the next LSN available in the log. When a transaction occurs thereby writing a log record, an LSN is produced identifying the corresponding log record. Accordingly at 46 the subroutine waits for such a transaction to write a corresponding first log record. Upon this event occurring, the new LSN thereby defined is added at 48 to the list of write transaction LSN's such as those shown in FIG. 3 of the example. The newly added LSN of course must be equal to or greater than LOWTRANLSN because LSN's are allocated sequentially in ascending order. Accordingly, no recalculation is necessary.

Once the list of LSN's such as that shown in FIG. 3 is non-empty, the next change to the list will be either the removal of an LSN when its corresponding transaction (giving rise to the LSN) finishes or, alternatively, when another addition of an LSN occurs as a transaction writes its first log record. Thus, at 50, the process waits for the next addition or deletion of an LSN from the list. At 52, a check is then made of whether the change to the LSN list is an addition of an LSN, in which case the process loops back at 54 to 48 to add the additional LSN to the list. On the other hand, if the change to the list at 52 is a deletion, it will be apparent that such deletion may cause the LSN list to be empty again which is thus determined at block 58. If the list is thereby emptied, the process loops at 60 back to re-initialize LOWTRANLSN to the next available LSN at 44. If on the other hand, the list is not thereby emptied decision block 58 is exited at 62 to block 64. In block 64, wherein the LSN list still contains members after a deletion, the value of LOWTRANLSN is updated by determining the minimum LSN of all LSN's currently in the list which then becomes the new LOWTRANLSN. The process then returns at 65 to wait for the next addition to or deletion from the list at 50.

Figure 5:
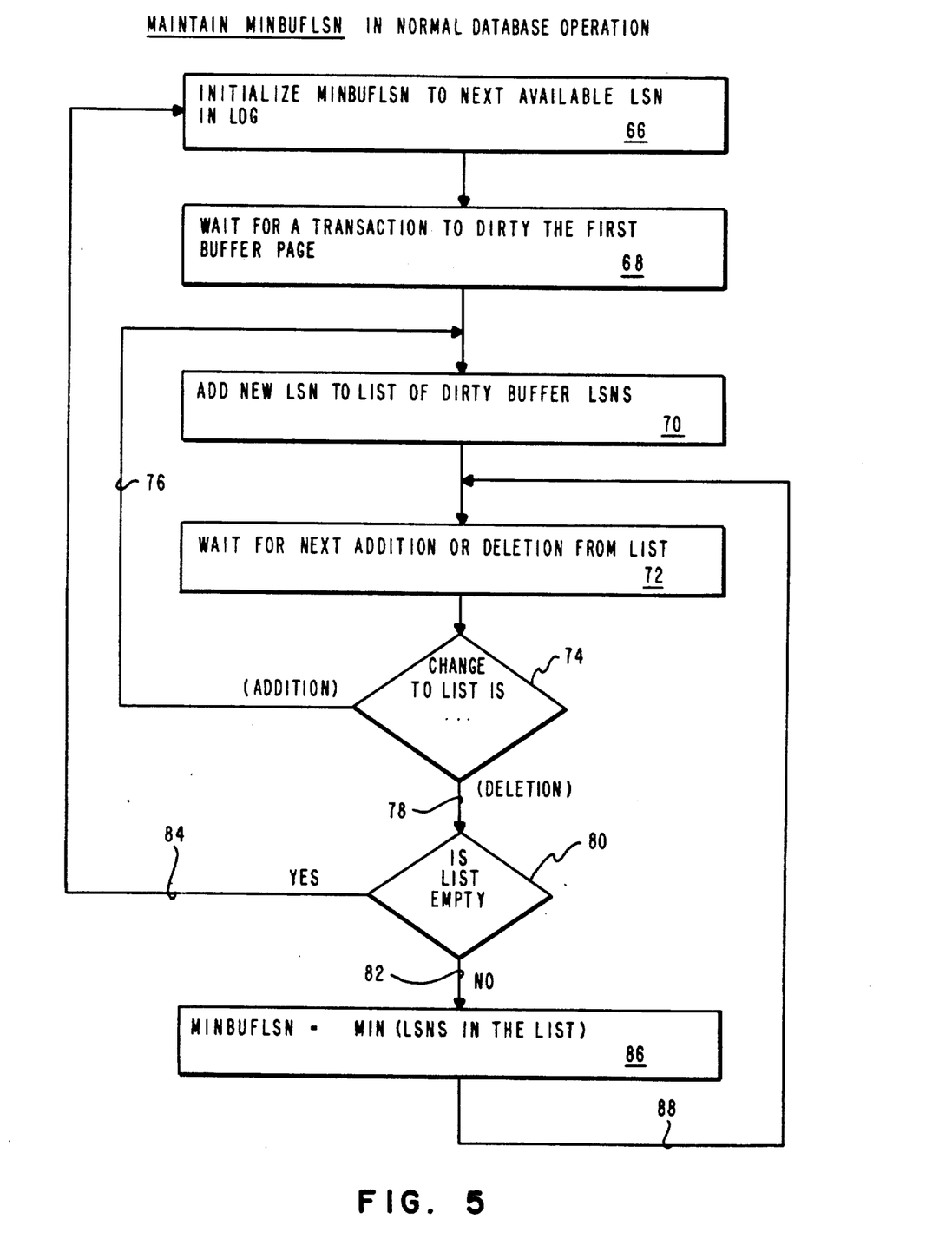
FIG. 5 is a flow diagram illustrating the method of deriving and maintaining MINBUFLSN during normal database operation as shown in block 10 of FIG. 1.

Referring now to FIG. 5, a method for maintaining the MINBUFLSN value during normal database operations will be hereinafter described in greater detail. Upon startup of the database, the list of LSN's corresponding to "dirty" buffer pages such as those shown in the RAM buffer 20 in the illustration of FIG. 2, will be empty. Accordingly, MINBUFLSN must be initialized to the next LSN available in the log as shown at 66. When a buffer page is written for the first time, i.e., "dirtied", it produces a corresponding LSN which identifies the log record corresponding to the write to that page which first "dirtied" it. Thus, at 68, the routine waits for a transaction to "dirty" the first buffer page and generate a corresponding LSN. A newly added LSN to the list such as that shown in FIG. 2 must be equal to or greater than any prior MINBUFLSN. This is because LSN's are allocated sequentially in ascending order, and consequently no recalculation is required. At 70 the new LSN is added to the list of "dirty" buffer page LSN's.

Once the list of LSN's is non-empty, the next change to the list will occur from either the removal of an LSN when a corresponding "dirty" buffer page is written out or, in the alternative, when another addition of an LSN occurs when a page in the buffer is "dirtied". Thus, at 72, the process waits for a next such addition or deletion from the LSN list corresponding to "dirtied" pages. At 74, a check is made to determine whether the change to the list is an addition or deletion. If an addition, the routine returns at 76 to 70 to add a new LSN to the list. If, on the other hand, the change to the list is a deletion, the process exits at 78 from the check at 74 to a next check 80. As with the process relating to LOWTRANLSN a deletion from the list may cause the list to be empty again which is checked for at 80. If the list is empty, the routine exits at 84 to the initial state at 66. If, on the other hand, the list is not emptied, the process exits check 80 at 82 to block 86. If, after a deletion, the LSN list still has members, the value of MINBUFLSN may need to be updated. Accordingly, at 86 the minimum of the LSN's in the list corresponding to "dirtied" pages is determined and assigned as the new value to MINBUFLSN, and the process loops back at 88 to wait for the next change to the list at 72.

With the values for MINBUFLSN and LOWTRANLSN being maintained at 10 and 12 in FIG. 1 by the correlative processes detailed with reference to corresponding FIGS. 5 and 4, respectively, periodically it is desirable to store these components of the checkpoint during normal operations as shown at 14 of FIG. 1. This writing out to disk of the checkpoint will now be described in greater detail with reference to FIG. 6.

Figure 6:
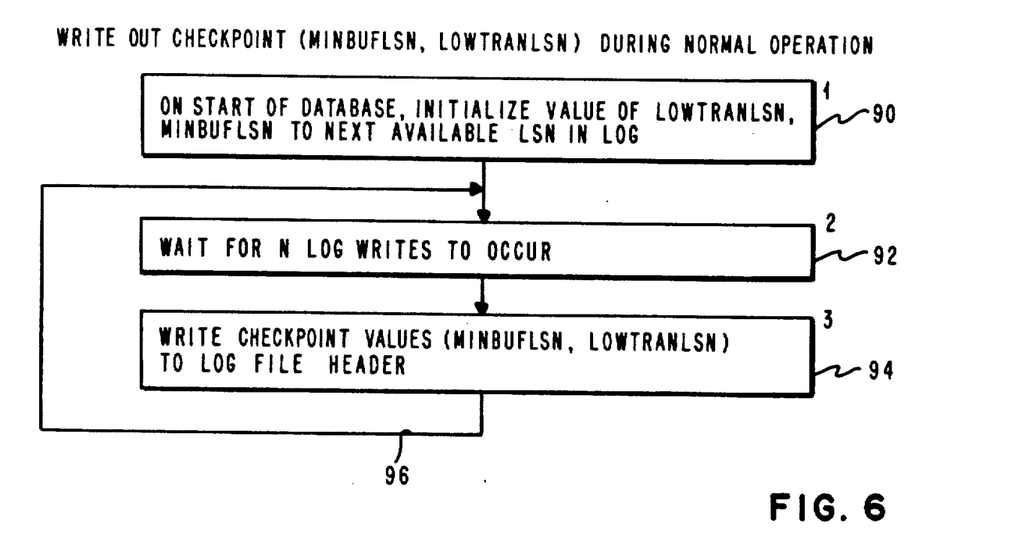
FIG. 6 is a flow diagram illustrating the method for storing the checkpoint (MINBUFLSN, LOWTRANLSN) shown at block 14 of FIG. 1 produced by the methods depicted in FIGS. 4 and 5 corresponding to blocks 12 and 10 of FIG. 1, respectively.

When the database is initially started, the values of LOWTRANLSN and MINBUFLSN are initialized to the next available LSN in the log at block 90. It is a feature of the invention that the checkpoint comprised of MINBUFLSN and LOWTRANLSN is stored from time to time so that it is available for recovery, such storage conventionally being in the form of a periodic write to disk. At 92, the subroutine waits for n log writes of 1 log record each before this storage step occurs, where n is selected for optimal performance of the checkpoint. For example, in updating a data page having one write of a log record, $n = 1$. If another transaction occurs and a corresponding log record is written, then $n = 2$. During normal operation of the database, the process simply counts the number of such writes to the log or corresponding numbers of LSN's until a value n is reached. At 94, the values of LOWTRANLSN and MINBUFLSN currently are thence written to the log file header. The process then loops back at 96 to 92 to again begin accumulating n counts of log writes prior to a next write at 94 of the next currently derived checkpoint (i.e., next current values of MINBUFLSN and LOWTRANLSN) to the log file header.

The general concept thus is to take a checkpoint from time to time as the log continues growing and write this checkpoint to disk. As the log grows, the checkpoint values in the log file header become out of date and optimality decreases. Obviously, if no additional writes to the log occur, however, the checkpoint values maintain the same optimality.

With respect to the choice of n, the desire is to use some measure of log file write activity to determine the interval at which checkpoints will be taken. In the implementation herein described this is done by counting the number of writes n to the log, this value becoming the determinant of the interval between subsequent checkpoint determinations and writes of the checkpoint to the log file header. However, it will be appreciated that the invention is not intended to be so limited to a particular metric of log file activity and other such determinants of n may be substituted. In the alternative, for example, such a measurement of log activity could be simply the count of the number of bytes written to the log which would provide a more precise interval but at a greater expense and overhead to maintain this value. Thus, although a need arises to measure the log file activity by means of the number of I/Os, number of bytes written to the log, or the like, the invention is not intended to be limited to a particular metric of log activity but rather contemplates use of a number of such techniques well known in the art. Moreover, it is contemplated that in some applications it may be desirable to externalize the choice of function causing the periodic storing of the checkpoint. In one such case, the user may vary at will configuration parameters in a user interface such as the value of n or precisely what n is a metric of. The fundamental concept is to periodically derive and store the checkpoint as a function of some measurement of log activity.

Referring back to FIG. 1, once the MINBUFLSN and LOWTRANLSN have been determined per reference numerals 10 and 12 and corresponding procedures of FIGS. 5 and 4, respectively, and further after the checkpoint comprising these MINBUFLSN and LOWTRANLSN values have been written out at 14 according to the procedure detailed with respect to FIG. 6, the utility of such logged checkpoint arises in its subsequent use for system recovery after a crash. Accordingly, such use of the checkpoint as indicated at reference 18 of FIG. 1 will now be described in greater detail with respect to the process of FIG. 7. It will be recalled that pursuant to the procedure of writing out the checkpoint (FIG. 6) the corresponding values for MINBUFLSN and LOWTRANLSN have been written to the log file header. Upon a system crash, these values of LOWTRANLSN and MINBUFLSN are fetched from the log file header as shown at 98. It will be noted that in accordance with the present invention, a significant benefit of being able to derive the checkpoint parameters from such a log file header read is that necessity for an analysis pass of the log file associated with conventional log recovery techniques is thereby obviated.

Figure 7:
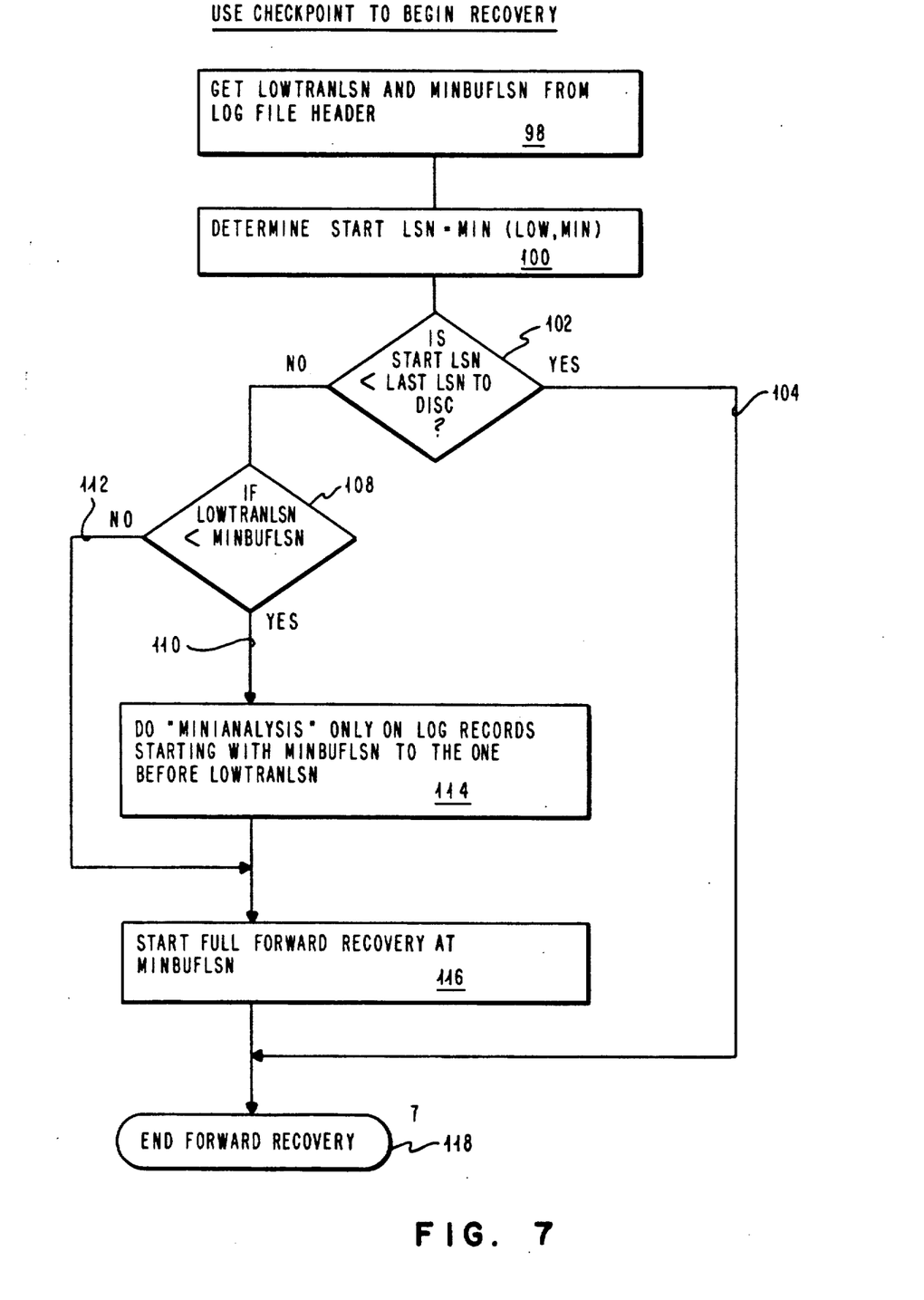
FIG. 7 is a flow diagram illustrating in more detail use of the checkpoint produced at blocks 10 and 12 of FIG. 1 and stored at block 14 of FIG. 1 to commence database recovery.

Continuing with FIG. 7, the starting LSN is determined at recovery, i.e., the minimum of the LOWTRANLSN and MINBUFLSN. At 102 a check is made as to whether this starting LSN is less than the last LSN written to disk. If so, the routine exits at 104 to 118 indicating the end of the forward recovery procedure. If the starting LSN is not less than the last LSN to disk, the procedure follows path 106 to a check at 108 which determines if LOWTRANLSN is less than MINBUFLSN. If LOWTRANLSN is less than MINBUFLSN, it is known that all updates recorded in the log records commencing with LOWTRANLSN up to the last update before MINBUFLSN were actually made to the disk version of the database, and accordingly there is no need to read in data pages to check. It is only necessary to keep track of transactions which start in this interval. Thus, the process exits at 110 to perform a "mini analysis" only on log records starting with MINBUFLSN through the log record immediately preceding LOWTRANLSN. This step will further be described hereinafter in greater detail. Once the log record is past the LSN associated with MINBUFLSN (as indicated by path 112 from block 108 or the exit from block 114), it is necessary to read in the data page from disk to see if the update was actually applied, this step being referred to as a full forward recovery at MINBUFLSN, 116. Thereafter, the process exits to 118 signifying the end of forward recovery.

Returning to the step indicated at 114 relating to the "mini analysis", from the foregoing it is known that a sequence of log records equal to or greater than those between LOWTRANLSN and MINBUFLSN exist. It is further known that all updates have been written to disk that are logged in log records commencing with LOWTRANLSN and stopping before the log record identified by MINBUFLSN. If the lowest LSN (i.e., MINBUFLSN which is determined at the same time as LOWTRANLSN) is greater than LOWTRANLSN then the LSN identifying the first data change not written to disk is MINBUFLSN. Operations logged starting with LOWTRANLSN up to MINBUFLSN have all been written out to disk. Otherwise they would be present in the list of the "dirty" log record LSN's utilized to calculate MINBUFLSN and thus MINBUFLSN would otherwise be less than or equal to LOWTRANLSN. In that case, the process of FIG. 7 is able to do a "mini analysis" phase wherein, unlike conventional write ahead log checkpointing, there is no need to read in data pages. This is because it is known that those updates referred to by the log records are out on disk. When MINBUFLSN is less than LOWTRANLSN, this fact is not known and the process is forced to bring in data pages.

The data page contains the LSN of the last update made to the particular data page. If the LSN of the log record is greater than the LSN on the data page, it is known that the update log was not applied out to disk and it must be re-applied. If the LSN on the data page is equal to or greater than the LSN of the log record the process is currently at, it is known that the update was in fact made. This is known in the art as a full redo which is costly because page I/Os are required each time a log record is processed in the forward recovery or redo phase.

In contrast, the technique of the present invention avoids the necessity for such I/O until MINBUFLSN is reached. In many cases numerous log records exist between LOWTRANLSN and MINBUFLSN. If LOWTRANLSN is less than MINBUFLSN, page I/O can thereby be avoided when examining those log records during redo. It is simply necessary to look for the start of new transactions without any necessity to perform I/O. In the analysis phase of prior checkpointing techniques state information was examined to determine the starting point of new transactions. In the present invention the analysis phase is avoided by the storing of MINBUFLSN and LOWTRANLSN thereby approximating some of the advantages of the analysis phase without actually having to perform it (thereby giving rise to the "mini analysis" terminology). Under the present method the log is processed. Also in some cases, wherein MINBUFLSN is equal to or less than LOW-TRANLSN, a full redo with concommitant page I/O is required. However, in accordance with the invention allowance is made for the possibility of costly I/O not being required with respect to particular log intervals.

For purposes of clarity the caller of the routines of FIGS. 4 and 5 for maintaining LOWTRANLSN and MINBUFLSN have been omitted. However, it will be apparent that an appropriate transaction manager well known in the art will be provided as a portion of the database manager for maintaining these subroutines as part of the transaction manager function in adding, deleting and updating records of transaction states.

In like manner, the callers of the routines for adding, deleting and maintaining the "dirty" page LSN list and list of LSN's in the transaction table depicted in FIGS. 2 and 3 have been omitted. However, a conventional buffer pool manager well known in the art will also be provided in the database system for performing such functions as adding, deleting and maintaining these "dirty" page LSN list and LSN values as buffers are brought in and paged out. Thus, for example, when it is time to write a new checkpoint per block 94 FIG. 6, the corresponding MINBUFLSN and LOWTRANLSN values can be withdrawn from storage locations wherein they are maintained by the aforesaid buffer pool manager.

Figure 8:
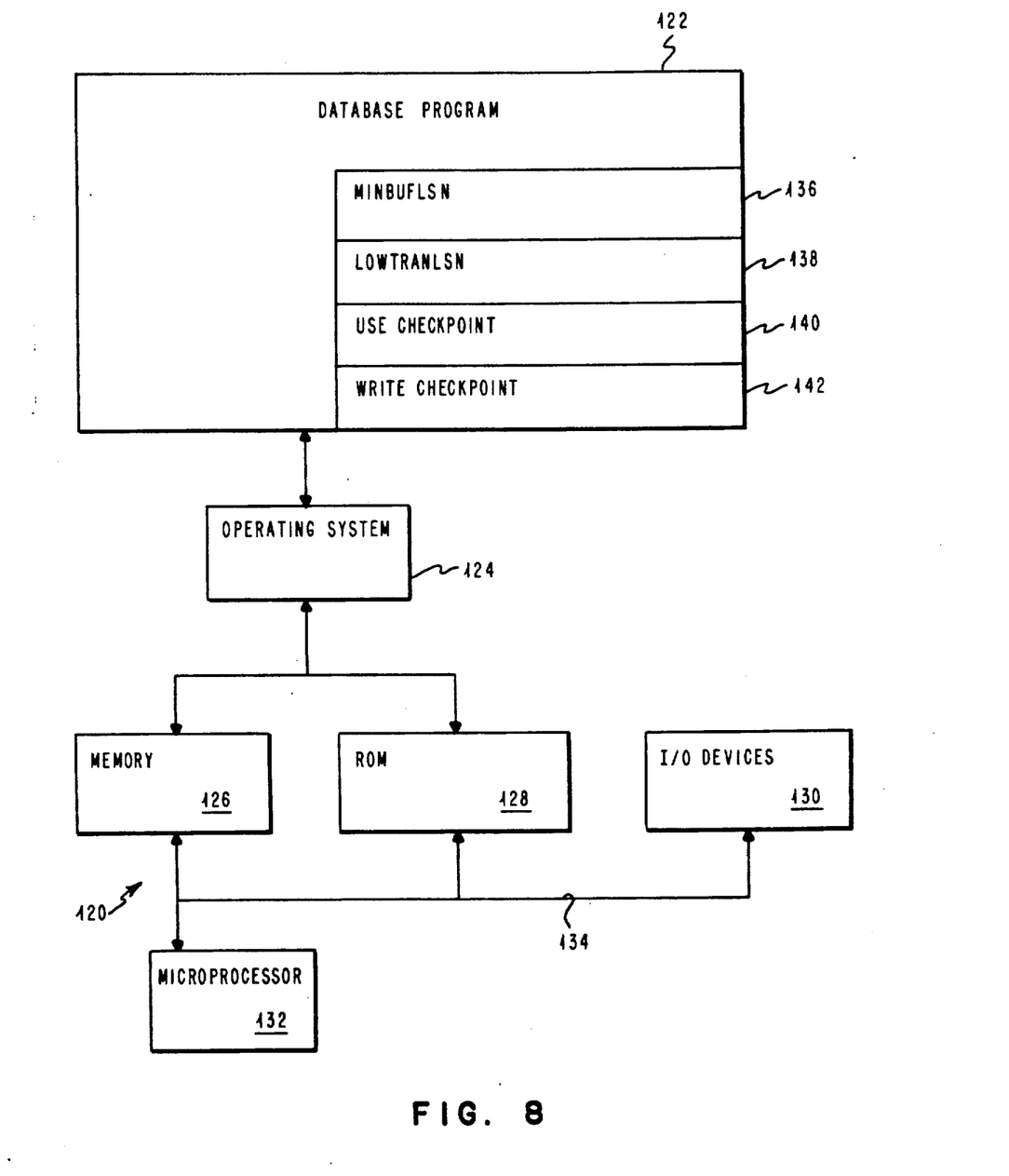
FIG. 8 is an illustration of a computerized database system with the recovery feature of the present invention.

Finally with reference to FIG. 8 the database system 120 of the present invention comprised of a microprocessing apparatus with associated software for executing the herein described processes is shown. The system is preferably configured in the manner of typical personal computer architecture such as that associated with the IBM Personal System/2 family of computers. In such computer systems, a microprocessor 132 is provided such as an Intel 80386 microprocessor or the like. Bus 134 is provided for interconnection between the microprocessor 132 and a number of associated functions implemented by various devices including memory 126, ROM 128, and various I/O devices 130. The bus, in conventional fashion, although shown functionally as one line will be recognized to include conventional address, data, and control lines for purposes well known in the art.

It will further be appreciated that for purposes of simplicity the devices 126, 128 and 130 are shown without adapter interfaces between them and the microprocessor 132 although such devices are provided for well known purposes either as part of the Personal System/2 computers, or as plug-in options.

The read only memory or ROM 128 contains the basic input/output operating system or BIOS which is executed by the microprocessor 132 and which controls fundamental operations of the system 120. An operating system 124, such as OS/2 is shown functionally and runs in a conventional manner in conjunction with the BIOS within the ROM 128, although the software for the operating system 124 is conventionally stored in other memory 126. The I/O devices 130 may include a keyboard, mouse, or the like for operator input, as well as a display such as the IBM Personal System/2 Color Display 8514 for providing visual outputs of the system to the user. The memory 126 may take the form of various media including disks and associated disk drives, one or more hard files or the like.

Further information regarding appropriate hardware and operating system software appropriate for the implementing the teachings of the present invention may be found in the following documents which are herein incorporated by reference: *OS/2 Programmer's Guide*, Iacobucci, Ed, McGraw Hill, 1988; *Technical Reference Manual, Personal System/2 (Model 50, 60 Systems)*, IBM Corporation, Part No. 68X2224, Order No. S68X2224; and *IBM Operating System/2 Version 1.0 Standard Edition Technical Reference*, IBM Corporation, Part No. 6280201, Order No. 5871-AA.

In accordance with the invention, in addition to the operating system 124, an application program 122 such as the database program shown is also loaded into memory 126. The database program 122 in addition to containing a number of relational database routines such as those well known in the art, will include computer program routines 136, 138, 140 and 142 for implementing the processes previously described with reference to FIG. 5, FIG. 4, FIG. 7 and FIG. 6. The database program 122 generally provides instructions to the microprocessor 132 to enable the system 120 to perform relational database functions. Thus, a user may interact with the system through various I/O devices 130 in response to outputs caused by execution of the program 122 on a display I/O device 130.

With respect to the computerized functions 136-142, values for MINBUFLSN and LOWTRANLSN will be periodically determined by the routines 136 and 138 during forward processing. These values will be periodically written out to memory 126 in response to the write checkpoint subroutine 142. It should be apparent that in addition to these LSN values being logged out to memory 126, changes and updates to the database also in the memory 126 of the system 120 (input through I/O devices 130) will also be logged to the recovery log stored in memory 126. At recovery time, the used checkpoint routine 140 portion of the database program 122 will be employed by the system 120 to fetch the values for MINBUFLSN and LOWTRANLSN in the manner previously described with reference to FIG. 7 so as to cause the microprocessor 132 to control recovery of the database resident in the memory 126 at the appropriate place in functional response to these MINBUFLSN and LOWTRANLSN values.

While the invention has been shown and described with reference to particular embodiments thereof, it will be understood by those skilled in the art that the foregoing and other changes in form and details may be made therein without departing from the spirit and scope of the invention.

We claim:

1. A method for use in a computerized database system having a processor and associated memory in a database comprising:
   storing data corresponding to a plurality of updated data pages in said memory;
   deriving from said stored data MINBUFLSNs functionally related to updates of corresponding ones of said updated pages;
   storing log records each corresponding to an in-flight database transaction in said memory;
   deriving from said stored log records LOWTRANLSNs functionally related to one of said in-flight transactions;

deriving checkpoints as a function of said MIN-BUFLSNs and said LOWTRANLSNs;

storing said checkpoints in said memory;

writing a plurality of log records to a recovery log in said memory;

generating a metric of said writing of said log records comprised of a number N corresponding to a number of said writes of said log records to said recovery log; writing a plurality of checkpoints as a function of said metric;

retrieving said MINBUFLSNs and said LOWTRANLSNs from one of said stored checkpoints stored in said memory;

comparing said retrieved MINBUFLSNs and said LOWTRANLSNs; and starting full forward recovery of said database by said system at a location in said recovery log functionally related to said MINBUFLSNs if said LOWTRANLSNs is equal to or greater than said MINBUFLSNs.

2. A method for generating components of a checkpoint for use in recovery of a database, comprising:

1. generating indicators of a first sequence of occurrence of updates to said database, each said update corresponding to an in-flight transaction and one of said indicators;
2. selecting one of said indicators as a first of said components of said checkpoint;
3. generating LSNs which are indicators of a second sequence of occurrence of first updates to data pages in a buffer;
4. selecting one of said LSNs as a value derived from a function MINBUFLSN corresponding to a first update of a first of said data pages in said buffer to be updated as a second of said components of said checkpoint;
5. writing to a recovery log a representation of said first and second components;
6. generating a measure of log record creation; and
7. regulating time between said writing of adjacent ones of said next sets of first and second components as a function of said measurement.

3. The method of claim 2 wherein said measurement comprises N writes to said recovery log.

* * * * *

UNITED STATES PATENT AND TRADEMARK OFFICE
CERTIFICATE OF CORRECTION

PATENT NO. : 5,043,866
DATED : August 27, 1991
INVENTOR(S) : William W. Myre, Jr. and Cheng-Fong Shih It is certified that error appears in the above-identified patent and that said Letters Patent is hereby corrected as shown below:

Col. 14, line 57, after "in" please insert --recovery of--.

Signed and Sealed this

Nineteenth Day of January, 1993

Attest:

DOUGLAS B. COMER

Attesting Officer     Acting Commissioner of Patents and Trademarks